United States Patent [19]
Ecklin

[11] 3,879,622
[45] Apr. 22, 1975

[54] PERMANENT MAGNET MOTION CONVERSION DEVICE

[76] Inventor: John W. Ecklin, 5100 8th Rd., South, Apt. 508, Arlington, Va. 22204

[22] Filed: Mar. 29, 1974

[21] Appl. No.: 456,336

[52] U.S. Cl. .................... 310/80; 310/103; 310/24
[51] Int. Cl. ........................................... H02k 7/06
[58] Field of Search ........................... 310/20–24, 310/80, 103, 190

[56] References Cited
UNITED STATES PATENTS

| | | | |
|---|---|---|---|
| 1,724,446 | 8/1929 | Worthington | 310/46 |
| 3,609,425 | 9/1971 | Sheridan | 310/103 |
| 3,703,653 | 11/1972 | Tracy et al. | 310/103 X |
| 3,773,439 | 11/1973 | Sheridan | 310/80 X |
| 3,811,058 | 5/1974 | Kiniski | 310/103 X |

Primary Examiner—Donovan F. Duggan
Attorney, Agent, or Firm—Crickenberger & Moore

[57] ABSTRACT

A permanent magnet motor in one embodiment utilizes a spring-biased reciprocating magnetizable member positioned between two permanent magnets. Magnetic shields in the form of rotatable shutters are located between each permanent magnet and the reciprocating member to alternately shield and expose the member to the magnetic field thereby producing reciprocating motion. A second embodiment utilizes a pair of reciprocating spring-biased permanent magnets with adjacent like magnetic poles separated by a magnetic shield which alternately exposes and shields the like poles from the repelling forces of their magnetic fields.

5 Claims, 4 Drawing Figures

PERMANENT MAGNET MOTION CONVERSION DEVICE

BACKGROUND OF THE INVENTION

This invention relates to the use of energy stored in the fields of permanent magnets. This energy is utilized in prime movers capable of producing work without the addition of energy from an outside source.

The world is now confronted with a crisis brought about by a shortage of sources of energy. People everywhere are being asked to conserve energy in every possible way, and scientists are seeking diligently for new sources of energy and for ways to utilize conventional sources more efficiently.

Electromagnetic energy is known and employed throughout the world in countless applications. Permanent magnets have played a large part in the development and utilization of electromagnetic energy, but no significant use as a primary energy source has ever been made of the potential energy which exists in the field of a permanent magnet. It is an object of this invention to provide a permanent magnet motor which produces reciprocating motion. The reciprocating motion thus produced may be converted to rotary motion by conventional mechanisms as desired.

SUMMARY OF THE INVENTION

The invention utilizes the attraction and repulsion properties of the magnetic fields of permanent magnets to produce reciprocating motion in a member of magnetizable material. A first embodiment of the invention employs a pair of permanent magnets positioned in spaced relationship along a common axis. A spring-biased magnetizable member is mounted along the common axis between the permanent magnets. A rotatable shutter of magnetic shielding material is mounted between the spring-biased magnetizable member and each permanent magnet. When the shutters are rotated to expose and shield, in alternate sequence, the magnetizable member from the magnetic fields of the permanent magnets, the magnetizable member is caused to reciprocate along the common axis between the permanent magnets. The reciprocating motion of the member can be converted to useful work by conventional mechanisms.

A second embodiment utilizes a pair of permanent magnets mounted for reciprocating movement along a common axis. The magnets are spring-biased in adjacent positions with like magnetic poles facing each other. A magnetic shielding shutter is moved in and out from between the facing magnetic poles to cause the permanent magnets to repel each other against the spring action to produce reciprocating motion.

DESCRIPTION OF THE PREFERRED EMBODIMENTS

Figure 1:
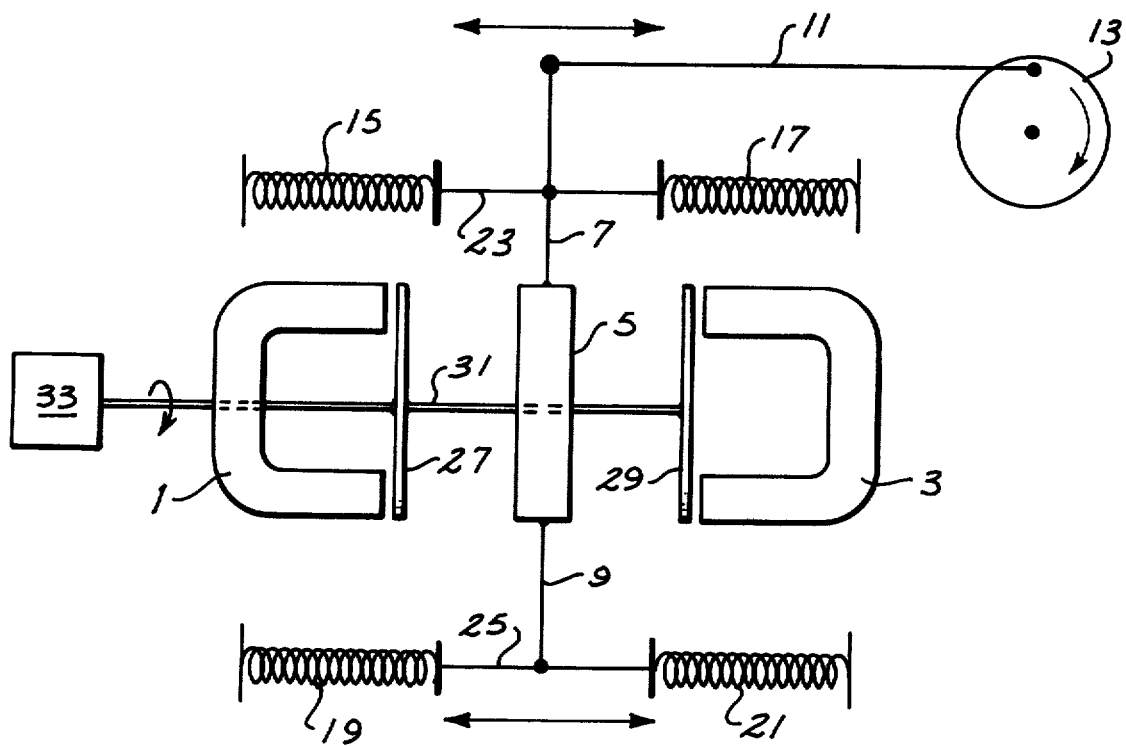
FIG. 1 is a diagrammatic view of one embodiment of a permanent magnet motor constructed in accordance with the invention.

The invention will be understood more readily by referring to FIG. 1 which is a diagrammatic view of a first form of the invention which may utilize either the attraction or repulsion of magnetic fields to produce reciprocating motion in a prime mover device. A pair of permanent magnets 1 and 3 are positioned in spaced relationship to each other with a magnetizable member 5 located therebetween. The member 5 is shown with arms 7 and 9 connected thereto. Arm 7 is also connected to driving link 11 which is provided to convert the reciprocating motion of member 5 to rotary motion by means of eccentric connection to circular member 13.

The member 5 is spring-biased in the position shown by means of springs 15, 17, 19 and 21. Biasing links 23 and 25 connect arms 7 and 9 to the spring members.

A pair of rotatable shutter members 27 and 29 are mounted on shaft 31 which is concentric with the common axis of permanent magnets 1 and 3 and magnetizable member 5. Shaft 31 is driven by a suitable device such as motor 33 shown.

Figure 2:
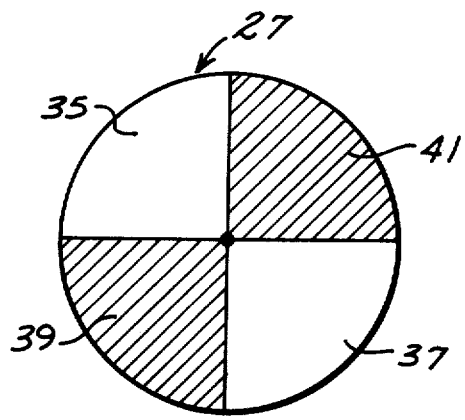
FIG. 2 is a plan view of one of the rotary shutters used as a magnetic shield in the device of FIG. 1.

FIG. 2 is a plan view of rotatable shutter 27 shown in FIG. 1. The shutter 27 comprises cutout portions 35 and 37 and portions 39 and 41 of magnetic shielding material. The positions of the magnetic shielding portions of shutters 27 and 29 are displaced 90° in rotation from each other so that when shutter 27 exposes the pole pieces of permanent magnet 1, shutter 29 is shielding the pole pieces of permanent magnet 3.

In operation the motor 33 turns shaft 31 and the rotatable shutters 27 and 29 attached thereto. As the pole pieces of one of the permanent magnets are exposed, magnetizable member 5 is attracted thereto, since at the same time the pole pieces of the other permanent magnet will be shielded. As the shutter continues rotation the pole pieces of each magnet will be alternately exposed and shielded causing magnetizable member 5 to reciprocate back and forth between the permanent magnets with assistance from the biasing springs, one pair of which will be compressed while the other pair is tensioned. The circular wheel 13 serves as a power-take-off means and converts the reciprocating motion of magnetizable member 5 to circular motion for shaft rotation.

An alternative arrangement could be achieved in the device of FIG. 1 by substituting a permanent magnet for the magnetizable member 5. In this case the magnet would have to be oriented so that like magnetic poles were always adjacent each other. The device would operate by the repulsion properties of like magnetic poles with the reciprocating member 5 being repelled by magnetic forces as the rotatable shutter uncovered the pole pieces.

Figure 3:
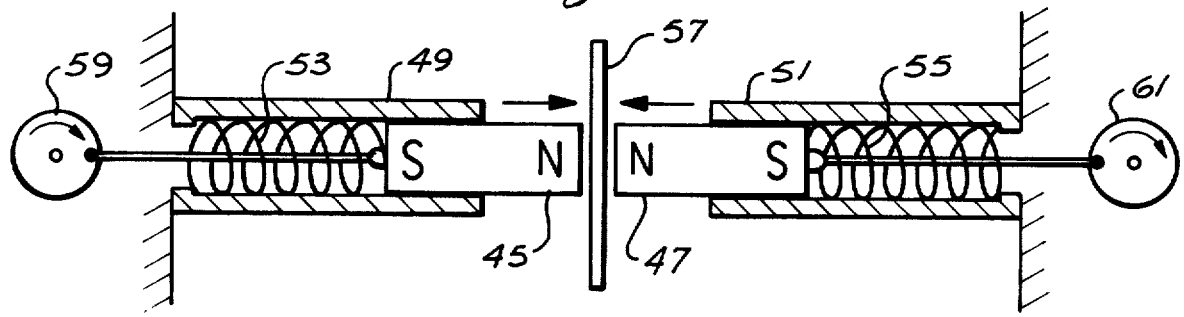
FIG. 3 is a diagrammatic view of a second embodiment of the invention with the magnetic shield in position.
Figure 4:
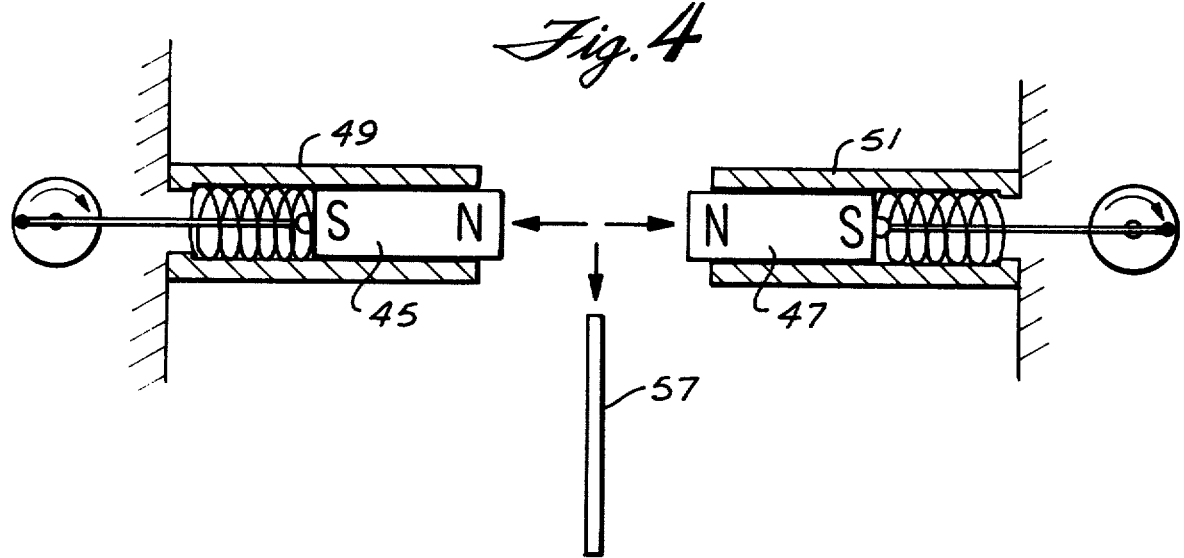
FIG. 4 is a diagrammatic view of the device of FIG. 3 with the magnetic shield removed from between the permanent magnets.

FIGS. 3 and 4 illustrate a second embodiment of the invention employing the property of magnetic repulsion. A pair of permanent magnets 45 and 47 are positioned in tubular members 49 and 51. Springs 53 and 55 bias permanent magnets 45 and 47 in position so that like magnetic poles are adjacent. A magnetic shutter member 57 separates permanent magnets 45 and 47 when they are in their fully-biased position.

When the magnetic shutter member 57, which acts as a magnetic shield between permanent magnets 45 and 47, is removed, as shown in FIG. 4, the magnets 45 and 47 repel each other and compress springs 53 and 55. When the shutter member 57 is again placed between magnets 45 and 47, the compressed springs 53 and 55 force magnets 45 and 47 back into the position shown in FIG. 3. Periodic action of shutter member 57 will produce a periodic reciprocating motion which may be converted to useful rotary motion by circular wheels 59 and 61. The shutter 57 may be mounted for rotary motions in a fashion similar to shutters 27 and 29 of FIG. 1.

What is claimed is:

1. A permanent magnet motor comprising
   a pair of permanent magnets positioned in spaced relationship,
   a reciprocating magnetizable member positioned between said permanent magnets,
   power-take-off means coupled to said reciprocating member,
   spring means biasing said reciprocating member between said permanent magnets,
   a pair of magnetic shields positioned on either side of said reciprocating member and between said permanent magnets to shield said reciprocating member from the magnetic fields of said permanent magnets, and
   means to move said shields in and out between said reciprocating member and said permanent magnets to alternately shield and expose said member to the magnetic fields of said permanent magnets,
   whereby the actions of the magnetic fields of the permanent magnets and the spring means cause the reciprocating magnetizable member to reciprocate between the permanent magnets.

2. The combination according to claim 1 wherein said magnetic shields comprise rotatable shutters positioned to be inserted and removed at right angles to the magnetic fields of the permanent magnets.

3. The combination according to claim 1 wherein said spring means comprise
   a spring connected to either side of said reciprocating member whereby motion of said reciprocating member in one direction will elongate one spring and compress the other to provide restorative forces to the reciprocating member at each end of its travel.

4. the combination according to claim 1 wherein said reciprocating magnetizable member is a permanent magnet.

5. A permanent magnet motor comprising
   first and second permanent magnets,
   first and second mounting means for mounting said first and second magnets in spaced relationship for reciprocating movement along a common axis with like magnetic poles adjacent each other,
   power-take-off means coupled to said first and second magnets, and
   magnetic shield means positioned between said first and second magnets for alternately shielding and exposing the magnets to the magnetic field of the other,
   first and second spring means for biasing said magnets in positions immediately adjacent each other,
   whereby the alternate withdrawal and replacement of said shield means causes the magnets to repel each other against the biasing action of the springs and to be returned to their original adjacent positions by the spring action.

* * * * *